United States Patent Office
3,039,779
Patented June 19, 1962

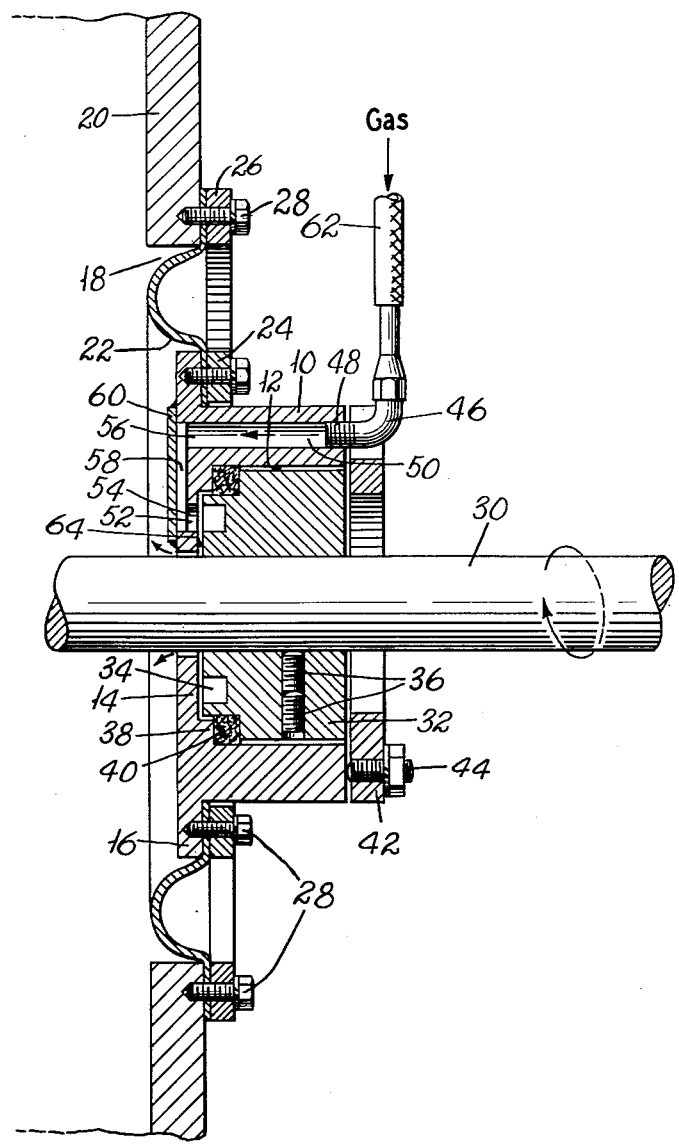

3,039,779
SHAFT SEAL
Stanley M. Laird, Bound Brook, N.J., assignor to Union Carbide Corporation, New York, N.Y.
Filed Apr. 30, 1959, Ser. No. 810,132
3 Claims. (Cl. 277—30)

This invention relates to shaft seals and more particularly to a novel gas-type shaft sealing apparatus.

The proper functioning of chemical processing equipment such as reaction vessels, pumps, stripping mills and mixers is dependent upon provision of an adequate seal where the rotating shaft penetrates the wall of the processing vessel. The seal must minimize and, if at all possible, prevent outward leakage of process fluids or powders, or inward leakage of air and the concomitant loss of reactants or influx of contaminants. Many types of shaft seals have been devised and are presently commercially employed. Among these may be mentioned close-fitting sleeve, labyrinths, resilient seal rings, mechanical seals, stuffing boxes and gas seals. The use of one or the other of these basically different types of seals in dictated by the sealing problem encountered in a particular installation.

A gas-type seal, wherein outward leakage is prevented by the pressure of a counter-flowing gas stream, is preferred in applications where high purity of the processed material is critical. In this type of processing, the use of a packing gland or stuffing box seal is precluded either by a sensitivity of the material being processed to the heat and abrasion generated at the seal contact or by the reactivity of chemicals in the processing zone with packing or packing lubricants. Another problem with the packing gland type of seal, found in processing powdery materials, is the tendency of fine particles, particularly of thermosetting resin, to lodge between the shaft and the gland causing, seizing of the shaft.

Heretofore, known gas seals employed a stationary ring or sleeve fixed in the wall of the processing equipment to form an annular space, termed a gas gap, with a shaft. A continuous stream of gas, usually air, nitrogen, or similar gas is driven through outlets in the ring into the annular space toward the material to be retained, at a pressure sufficient to prevent counterflow of the material. Gas seals of this design have been found not to be satisfactorily leakproof. The cause of leakage has been determined to be that the dimensions of the annular space between the stationary ring and the rotating shaft do not remain constant. This results in varying pressures around the shaft and consequent seal failure. Efforts to maintain adequate pressure at all points around the shaft, despite a constantly changing gas gap generally result in excessive gas flow, which is not only wasteful, but may also be intolerable due to the inability of either the process or the equipment to absorb such excesses.

Variations in the dimensions of the annular gas gap are usually due to imperfections, such as nicks and protrusions and bowed portions, on the shaft surface, and flaws in the shaft itself or in the coupling or drive assemblies which will cause the shaft to traverse a small orbit when it rotates. Thus, the annular ring does not always remain concentric with the shaft. A sequence of this is the need for a stationary ring large enough to clear all the imperfections in the shaft surface and any vagaries in rotation path. It is for these reasons that heretofore known gas seals have had to employ an annular ring providing gas gap appreciably greater than would otherwise be required, and is why known gas seals suffer from the deficiencies set forth above.

Accordingly, it is an object of my invention to provide a novel gas seal apparatus which overcomes deficiencies found in heretofore known gas seal apparatus.

It is another object of my invention to provide a gas seal apparatus wherein the gas gap is constant and unchanging during rotation of the shaft.

It is still another object of my invention to provide a gas seal apparatus wherein gas flow is even, uniform and constant throughout the gas gap during operation.

These and other objects of my invention are accomplished by the use of a novel gas seal apparatus comprising a flexibly supported body having a bore and an inturned flange with an opening therein, and a hub journaled in the fore adjustably mounted in relation with the inturned flange, forming a gas gap therewith, and adapted to be fixed on a shaft extending coaxially through the bore, the hub having an annular groove in registry with the opening in the flange and the body having a port receiving gas under pressure and a passageway extending between the opening in the flange and the port in the body whereby gas flows into the annular groove and flows evenly and uniformly toward the shaft.

A preferred embodiment of my apparatus is described hereinbelow in conjunction with the attached drawing wherein the single FIGURE is a sectional side elevation of the apparatus.

In detail, the apparatus comprises a body 10 having a bore 12, an inturned flange 14 and an outturned flange 16. The body 10 is gas- and fluid-tightly flexibly supported in aperture 18 in the wall 20 by flexible ring 22. The wall 20 is representative of the shell of any equipment with which the use of a gas seal apparatus is advantageous. Flexible ring 22 is mounted on wall 20 and outturned flange 16 at its inner and outer peripheries by metal rings 24 and 26, respectively. Each metal ring is secured by circumferentially spaced cap screws 28.

Equipment shaft 30 extends coaxially through body 10 and has a clearance at its nearest point, inturned flange 14, sufficient to permit adequate flow of gas into the equipment to seal the shaft. Hub 32 having an annular groove 34 is fixed on equipment shaft 30 by a pair of set screws 36 suitably set 60° apart. The hub 32 is journaled in bore 12 in axially spaced relation with inturned flange 14 and cooperates with shoulder 38 of the body 10 to retain a compressed sealing ring 40. In this embodiment the hub 32 is journaled in a sleeve bearing, but the use of other types of bearings, e.g., ball bearings, is within the scope of my invention. The collar and body bearing surfaces can be conveniently lubricated by a grease cup or similar conventional means. It is important to note that the design of my apparatus prevents lubricant from coming in contact with processed materials.

On the end of body 10 opposite inturned flange 16 is a retaining ring 42 movably mounted by suitable means, such as screws passing through retaining ring 42 and tapped in body 10, and in lubricated contact with hub 32. The exial distance between retaining ring 42 and body 10 is adjustable by rotation of circumferentially spaced adjusting screws 44, threaded in retaining ring 42. Rotation of adjusting screws 44 inward or outward moves retaining ring 42 correspondingly; hub 32 moves a corresponding axial distance to increase or lessen its proximity to inturned flange 14.

Gas is received from flexible conduit 62 through elbow 46 and port 48 into body 10, under sufficient pressure to maintain flow through the apparatus. Pressure exerted by the gas and compressed sealing ring 40 forces hub 32 against retaining ring 42. Port 48 communicates with passageway 50 extending between said port and an opening 52 located in inturned flange 14, which opening is always in registry with a portion of annular groove 34. Passageway 50 is simply and easily constructed by drilling parallel holes 54 and 56 in the body 10 and inturned flange 14, respectively, milling a portion of the body 10 intervening between hole 54 and 56 to form a slot 58, and covering the resulting channel with a gas-tight cover 60. Differently constructed passageways are also within the scope of this invention.

In operation, a gas seal is effected by introducing suitable gas, under uniformly controlled pressure so that the flow of gas is uniform in gas gap 64 from a source of supply fitted with a reducing valve, shut-off valve and gauge (not shown) through flexible hose 62 into elbow 46. The gas traverses passageway 50 and passes from opening 52 into the adjacent portion of annular groove 34 located in rotating hub 32. The gas pressure is rapidly equalized at all points within the annular groove 34 and gas flows evenly over the edges thereof into annular gas gap 64 formed between hub 32 and the portion of inturned flange 14 adjacent the rotating shaft 30, and thence around the shaft. Flow of gas into the gas gap 64 toward the shaft is even at all points around the circumference of the annular groove. Two expansions or slowings of the flow rate of the gas occur in my apparatus, the first in gas gap 64 and the second in the annular space between the body 10 and the shaft 30.

The facility with which gas gap adjustment is accomplished in the apparatus is one of the outstanding features of my invention. The adjustment can be made either before mounting the apparatus on the process equipment, or with equal ease, while the apparatus is mounted, without necessitating disassembly of the apparatus or entry into the process equipment. A further advantage is that the gas gap does not require readjustment each time the equipment is taken down and reassembled due to the integral nature of the sealing apparatus.

The primary advantage of my apparatus, however, is the even, uniform and minimal flow of gas into the non-varying gas gap irrespective of a lack of alignment of, or surface imperfections in, the equipment shaft, to maintain a leakproof or virtually leakproof seal thereat. This advantage is achieved by having the apparatus self-aligning with the shaft, furnishing both its own bearing and gap surfaces.

Practical, operational advantages are also provided, such as automatic prophylaxis of lubricant from the bearing surfaces entering the gas stream and contacting the production material, and the impossibility of loose parts, e.g., nuts and bolts, from falling into the product since all parts on the product side of the gas stream are retained by the equipment shaft.

The foregoing advantages have not been obtained in combination heretofore. They are in fact obtainable only with my novel gas-seal apparatus which is described above in a particular embodiment to illustrate the principle and practice of my invention to those in the art, and is not limited except as defined in the appended claims.

What is claimed is:

1. Gas seal apparatus comprising in combination a body having a bore and an inturned flange with an opening therein, a shaft extending coaxially in said bore and defining an annular space with said bore sufficient to permit adequate flow of gas to seal the shaft, a hub fixed on said shaft and journaled in said bore and spaced apart from said inturned flange to form a gas gap, said hub having an annular groove in registry with said opening in said inturned flange, said body having a port receiving gas under pressure and a passageway extending between said opening and said port in said body and into the annular space defined by said body and said shaft.

2. Apparatus as claimed in claim 1 in combination with manual means for selectively axially adjusting said hub to increase or decrease gas gap width.

3. Apparatus as claimed in claim 1 wherein said apparatus in gas- and fluid-tightly flexibly supported in shell of processing equipment.

References Cited in the file of this patent
UNITED STATES PATENTS

| | | |
|---|---|---|
| 1,876,515 | Emmet | Sept. 6, 1932 |
| 1,930,210 | Carrier | Mar. 28, 1933 |
| 1,978,239 | Wheeler | Oct. 23, 1934 |
| 2,430,918 | Curry | Nov. 18, 1947 |